United States Patent [19]

Brüschke

[11] Patent Number: 4,789,480

[45] Date of Patent: Dec. 6, 1988

[54] MEMBRANE MODULE AND THE USE THEREOF FOR THE SEPARATION OF LIQUIDS ACCORDING TO THE PERVAPORATION PROCESS

[76] Inventor: Hartmut Brüschke, Kurpfalzstr. 64, 6907 Nussloch, Fed. Rep. of Germany

[21] Appl. No.: 753,796

[22] Filed: Jul. 8, 1985

Related U.S. Application Data

[63] Continuation of Ser. No. 499,846, Jun. 1, 1983, abandoned.

[30] Foreign Application Priority Data

Jun. 1, 1982 [DE] Fed. Rep. of Germany ....... 3220613

[51] Int. Cl.$^4$ ............................................. B01D 53/22
[52] U.S. Cl. ........................................ 210/640; 55/16; 55/158; 210/321.83; 210/321.85; 210/494.3; 210/494.1
[58] Field of Search ................... 210/321, 433.2, 494.1, 210/494.2, 494.3, 640, 499, 846, 321.74, 321.76, 321.83, 321.85, 321.86; 55/16, 158

[56] References Cited

U.S. PATENT DOCUMENTS

| | | | |
|---|---|---|---|
| 2,958,657 | 1/1960 | Binning et al. | 210/640 X |
| 3,252,272 | 5/1966 | Hazen et al. | 55/158 |
| 3,367,504 | 2/1968 | Westmoreland | 210/321.1 |
| 3,367,787 | 2/1968 | Thijssen et al. | 210/640 X |
| 3,839,201 | 10/1974 | Miller | 210/22 |
| 4,083,780 | 4/1978 | Call | 210/23 H |
| 4,147,114 | 4/1979 | Holmes | 210/384 X |

FOREIGN PATENT DOCUMENTS

| | | |
|---|---|---|
| 0040411 | 5/1981 | European Pat. Off. |
| 2634369 | 2/1977 | Fed. Rep. of Germany |
| 1096680 | 12/1967 | United Kingdom |
| 2063705 | 6/1981 | United Kingdom |

OTHER PUBLICATIONS

Kremen, Seymours, "Technology and Engineering of R06A-Spiral Wound Osmosis Membrane Modules", Chap. 17 of *Reverse Osmosis and Synthetic Membranes*, S. Sourirajan editor, National Res. Council Canada, 1977, pp. 371-385, NRCC. 15627.

*Primary Examiner*—Peter Hruskoci
*Attorney, Agent, or Firm*—Foley & Lardner, Schwartz, Jeffery, Schwaab, Mack, Blumenthal & Evans

[57] ABSTRACT

A membrane module is disclosed which comprises at least one elongated, planar membrane element which is composed of two membranes aligned opposite one another so as to define a closed cavity into which active surfaces of both membranes face. At both ends of the membrane element, separate conduits attached to the two membranes are in communication with the cavity, such that the feed flow from one conduit to the other through the cavity is radial, relative to the membrane element. The membrane element can be spirally wound around one or both of the conduits.

11 Claims, 2 Drawing Sheets

MEMBRANE MODULE AND THE USE THEREOF FOR THE SEPARATION OF LIQUIDS ACCORDING TO THE PERVAPORATION PROCESS

This application is a continuation of application Ser. No. 499,846, filed June 1, 1983, now abandoned.

BACKGROUND OF THE INVENTION

The present invention is concerned with a membrane module, especially for performing separation of liquid mixtures according to the process of liquid permeation or pervaporation.

The state-of-art systems for the separation of substance mixtures have incorporated spiral-wound modules. Membranes suitable for use in the manufacture of such modules are arranged so that the inactive membrane faces are superposed, i.e. with the active faces thereof arranged outwardly, and are cemented together at the edges. Inserted into the resulting pockets are fleeces or cloths for draining the permeate. One or several of the pockets are secured to tubes provided with bores in the area of the cylindrical surface such that draining of the permeate can take place through the bores into the interior of the tube, there being no possibility of an outflow from the tube interior onto the active external surface (separating layer) of the membranes. Subsequently, the one or several membrane pockets, the draining discharge of which is in communication with the tube interior, are spirally wound about the tube, with interlayers of plastic fabric between the active membrane faces keeping open a liquid channel, and are sealed. The so obtained membrane modules thus obtained have two liquid channels separated by the membrane:

(a) the feed channels between the active membrane faces kept open in the axial direction by plastic fabric, and (b) the permeate conduits spirally fed about the central tube, formed by the draining fleece or cloth and discharging the permeate passing through said membrane into the interior of the central tube.

These conventional spiral-wound modules are especially used for the separation of water from solutions, in accordance with the principle of reverse osmosis. They exhibit a high packing density ($m^2$ membrane area per volume of module) and a high compressive strength; however, an essential disadvantage is involved therewith that has a substantial deterimental effect on special separating functions: the permeate passing through the membrane only through draining fleece via an extended path can be discharged into the central permeate collecting pipe, with the available flow cross-section being further reduced by the compressive load acting upon the active membrane faces. Moreover, substantial pressure losses occur between the interior of the permeate collecting pipe and the end of the draining fleece.

Different approaches have been tried to ease these inherent disadvantages of spiral-wound modules; however, practical experience has shown that when using such modules, satisfactory results can be obtained only if the volume ratio between intake and permeate does not substantially fall below a value of 10. While this is still acceptable in liquid-liquid separations in which no noteable change in the specific volume occurs upon passage through the membrane, a separation according to the pervaporation process cannot be performed economically with the state-of-art spiral-wound modules. In that process, the permeate vaporizes upon passage through the membrane and is discharged either by evacuation or by way of an inert gas stream. It is already by evaporation that the specific volume so substantially increases that the vapor volumes then under a reduced pressure can no longer be discharged through a draining fleece. As in the pervaporation process there is only a minor inter-membrane pressure difference, and pressure looses in the permeate channel cannot be accomodated. These disadvantages are avoided by the present invention.

SUMMARY OF THE INVENTION

The invention is thus concerned with a membrane module for the separation of substance mixtures, including a pocket-shaped membrane element comprising two oppositely disposed membranes containing separating layers optionally held in spaced relationship by means of an insert, with a supply/discharge conduit in communication with the interior of said pocket being provided on one end and with the membrane element being accommodated in a housing having supply and discharge lines, which is characterized in that the separating layers of the membranes are facing one another and that the membrane element also on the other end has a supply/discharge conduit in communication with the interior of the pocket.

DETAILED DESCRIPTION OF PREFERRED EMBODIMENT

According to the invention, two flat membranes suitable for separation mixtures by means of pervaporation are so superposed that the separating layers (active layers) of the membranes are facing one another. In special cases, it can be of advantage to insert between the membrane faces a plastic fabric to thereby attain a higher turbulence of the liquid flowing therethrough. Preferably, the pockets-shaped membrane element is formed so that thin strips of a sealing material, e.g. silicone rubber or another polymer that is also to have a special adhesive power, are interposed between the membranes along the longitudinal sides. Preferably, the two membranes in a known manner are then stitched through the inserted sealing strip, with one seam or a plurality of parallel seams being provided. It will be achieved thereby that the forces occurring during operation of the module not only are transferred to the active membrane surfaces (separating layers) by cementing where the separating layers could be easily removed from their support, but are also transferred through the seams to the cloth or fleece carrying the membrane thereby being better distributed, not only permitting operation of the system at higher pressure differences but also avoiding likelihood of a removal of the active separating layer.

Depending on the sewing material used, it may be necessary to perform an additional sealing of the holes formed during stitching. For these purposes, a sealing material can be applied in a known manner to the seams on the fleece or cloth side of the membrane, or an adhesive tape can be applied to the edges also covering the seams on the fleece or cloth side.

In this manner, a pocket will be formed, stitched and sealed along the longitudinal sides, comprising two membranes facing one another with the active separating layer, between which a channel that is permeable to liquids is created. The open narrow sides of the pocket are now cemented in a known manner to two supply-/discharge conduits, preferably tubes, preferably having bores on the area of their cylindrical surface such that there is only one connection through the bores between the interior of the tubes and the interior of the pocket formed by the membranes.

One end of each tube, respectively, is sealed in liquid- and gas-tight manner by way of a suitable means. The mixture to be separated is then supplied through a tube, and through the bore in the cylindrical face enters the liquid channel formed by the membranes, exiting through the bores in the cylindrical surface of the second tube and being discharged from the system through the second tube. If the system is an evacuated space or if an inert gas stream is guided over the open fleece or cloth side, permeating components can more easily pass through the membrane and evaporate at the open side thereof. This will deplete the mixture in the channel formed by the membranes of the more easily permeating components until the desired separation and re-concentration have been achieved.

For the sake of easier handling and for attaining a higher packing density, the arrangement comprised of the two tubes and the membranes therebetween is spirally wound either about only one of the two tubes or in equal or different shares about both tubes either in the same direction or in counter-direction. A wide-meshed plastic fabric wound at the same time provides for keeping apart the fleece or cloth side of the membrane during operation and, hence, for keeping open the permeate channel.

The spiral wound apparatus is held together and in shape by an outer envelope. A plurality of such devices can be jointly accommodated in a suitable housing which is evacuated or through which an inert gas stream flows. The devices are so aligned that the mixture to be separated will flow therethrough either in parallel or in succession; an optimum arrangement for the respective problem of separation can be computed by the one skilled in the art from the performance data of the membranes as used.

The invention membrane module having open permeate channels not only is suitable for a separation of mixtures by means of pervaporation but also, when using corresponding membranes, for the advantageous separation of gas mixtures.

BRIEF DESCRIPTION OF THE DRAWINGS

The invention will now be described with reference to the drawings, wherein

In FIG. 1, the membrane module 1 comprises a membrane element 2 in a housing 7 having supply and discharge conduits 8, 8', 8''.

FIG. 2 shows a membrane element 2 with two membranes 4,4' and plastic fabric 3 therebetween, with separating layers 9,9' (see FIG. 3) facing one another, i.e. the separating layers are disposed inwardly. The two membranes 4,4' are cemented together along the longitudinal sides thereof and, in addition, are reinforced by seams 11,11'. Along the narrow sides 5,5', the pocket-shaped structure comprised of membranes 4,4' is so cemented to tubes 6,6' having bores 10,10' that tubes 6,6' are in communication with the interior of the pocket. Intake is via one of the two tubes 6,6' and discharge in reconcentrated form is over the other of the two tubes 6,6', while the permeate passes through the membranes and is removed from housing 7 (FIG. 1).

FIGS. 4A and 4B show in respective cross-section, a spirally wound membrane element 2, with a spacer 12 providing for the required distance between the membrane coils.

Figure 1:
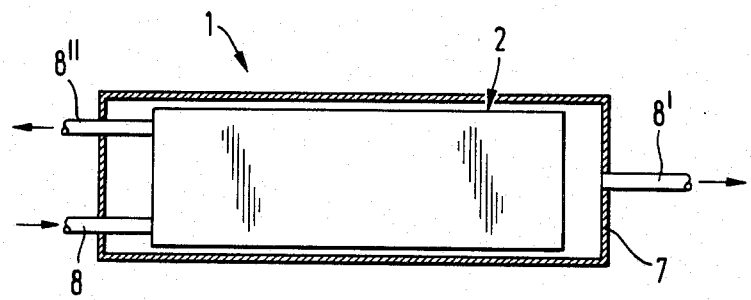
FIG. 1 is a schematic view of a membrane module according to the invention.
Figure 2:
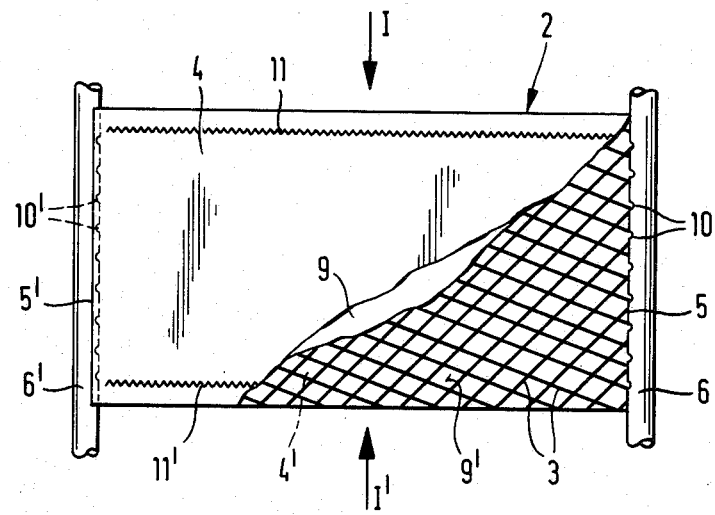
FIG. 2 is a plan view of a membrane element partially broken away.
Figure 3:
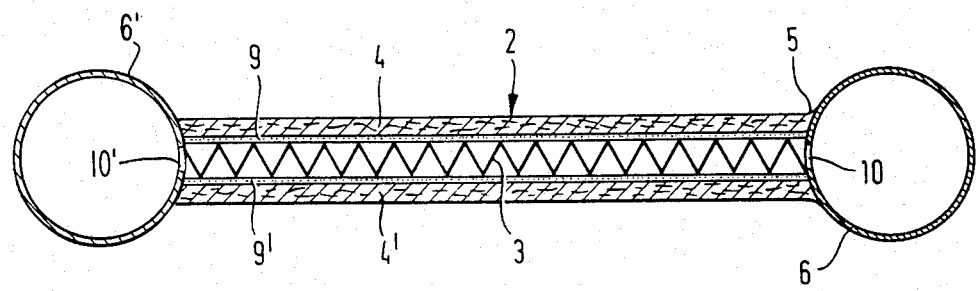
FIG. 3 is a sectional view of FIG. 2, normal to line I,I'.
Figure 4A:
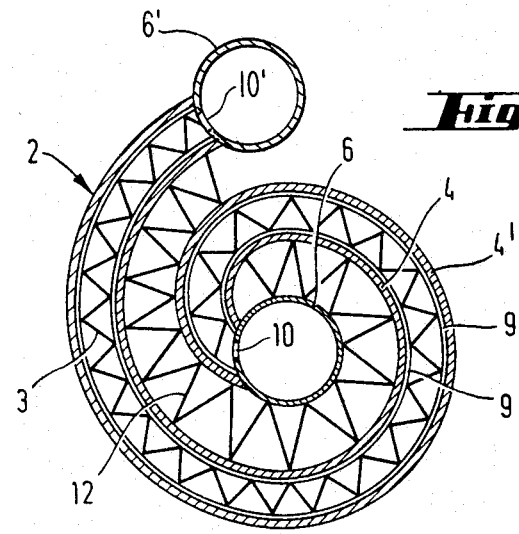
FIGS. 4A and 4B depict, respectively, cross-sectional view of a spiral wound membrane module of the invention wherein the membrane is wound on one conduit (4A) and on both conduits (4B).
Figure 4B:
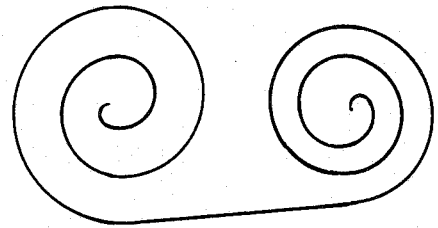

What is claimed is:

1. A pervaporation membrane module for separating constituents of a mixture comprising a first substance and a second substance different from said first substance, comprised of
   (1) at least one elongated membrane element having a first end and a second end, said membrane element comprising a first membrane disposed oppositely from a second membrane to define a cavity which is sealed along its longitudinal borders, said first membrane having an active separating surface (i) and said second membrane having an active separating surface (ii), such that active separating surface (i) faces active separating surface (ii) and both active separating surfaces (i) and (ii) face into said cavity;
   (2) a first conduit and a second conduit, each in communication with said cavity and each sealingly joined, respectively, to said first end and said second end of said membrane element, wherein said membrane element is spirally wound around at least one of said first and second conduits; and
   (3) means for providing that (a) feed flow of said mixture from one of said first conduit and said second conduit to the other conduit through said cavity is radial relative to said membrane element, (b) permeate flow through said membrane element is axial, (c) a pressure gradient is directed outwardly from said cavity, and (d) said permeate flow is from the inside to the outside of said cavity by pervaporation.

2. A membrane module according to claim 1, wherein a layer of sealing material is interposed between said first and second membranes along said longitudinal borders of said membrane element.

3. A membrane module according to claim 2, wherein stitching through said sealing material provides at least one seam along said longitudinal borders.

4. A membrane module according to claim 1, wherein a spacer element is disposed in said cavity between the active surfaces of said first and second membranes facing into said cavity.

5. A membrane module according to claim 1, further comprising a housing containing said membrane element, said housing having a discharge conduit for permeate from said membrane element.

6. A membrane module according to claim 5, comprising a plurality of membrane elements contained in said housing.

7. A membrane module according to claim 5, wherein said housing comprises an evacuable casing.

8. A membrane module according to claim 5, further comprising means for directing a stream of gas through said housing and around said membrane element, said gas being inert relative to said constituents of said mixture.

9. A membrane module according to claim 1, wherein each of said first and second membranes are flat membranous sheets.

10. A pervaporation process for separating constituents of a mixture comprising a vaporizable first substance and a second substance different from said first substance, comprising (a) introducing said mixture into a membrane module comprised of
   (1) at least one elongated membrane element having a first end and a second end, said membrane element comprising a first membrane disposed oppositely from a second membrane to define a cavity which is sealed long its longitudinal borders, said first membrane having an active separating surface (i) and said second membrane having an active separating surface (ii), such that active separating surface (i) faces active separating surface (ii) and both active separating surfaces (i) and (ii) face into said cavity, and
   (2) a first conduit and a second conduit, each in communication with said cavity and each sealingly joined, respectively, to said first end and said second end of said membrane element, wherein said membrane element is spirally wound around at least one of said first and second conduits;
(b) conducting (i) feed flow of said mixture from one of said first conduit and said second conduit to the other conduit through said cavity radially relative to said membrane element and (ii) permeate flow through said membrane element axially;
(c) imposing a pressure gradient directed outwardly from said cavity whereby said permeate flow is from the inside to the outside of said cavity; and
(d) causing said first substance to vaporize upon passing from each cavity through said first and second membranes to produce a gaseous permeate.

11. A process according to claim 10, wherein each of said first and second membranes are flat membranous sheets.

* * * * *